United States Patent
Matsumoto et al.

(10) Patent No.: US 6,708,098 B2
(45) Date of Patent: Mar. 16, 2004

(54) LANE-KEEP CONTROL SYSTEM FOR VEHICLE

(75) Inventors: Shinji Matsumoto, Yokohama (JP); Genpei Naito, Yokohama (JP); Satoshi Tange, Kanagawa (JP); Hiroyuki Yoshizawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 21 days.

(21) Appl. No.: 10/228,042

(22) Filed: Aug. 27, 2002

(65) Prior Publication Data

US 2003/0062769 A1 Apr. 3, 2003

(30) Foreign Application Priority Data

Sep. 28, 2001 (JP) .......................................... 2001-304139

(51) Int. Cl.[7] ................................................ G06G 7/76
(52) U.S. Cl. ............................. 701/70; 701/23; 701/41; 180/204; 180/401; 180/446
(58) Field of Search .............................. 701/23, 41, 48, 701/70, 78; 180/204, 401, 443, 446

(56) References Cited

U.S. PATENT DOCUMENTS

| | | | |
|---|---|---|---|
| 4,720,790 A | * 1/1988 | Miki et al. ...................... 701/41 |
| 4,809,181 A | 2/1989 | Ito et al. | |
| 4,973,294 A | * 11/1990 | Kobari et al. ................. 475/180 |
| 4,998,593 A | * 3/1991 | Karnopp et al. ............. 180/408 |
| 5,079,708 A | 1/1992 | Brown | |
| 5,089,966 A | * 2/1992 | Fukushima et al. ............ 701/38 |
| 5,265,020 A | 11/1993 | Nakayama | |
| 5,367,457 A | * 11/1994 | Ishida ........................... 701/28 |
| 5,373,911 A | * 12/1994 | Yasui ........................... 180/168 |
| 5,642,281 A | * 6/1997 | Ishida et al. ................... 701/41 |
| 5,702,165 A | 12/1997 | Koibuchi | |
| 5,828,972 A | * 10/1998 | Asanuma et al. .............. 701/41 |
| 5,845,222 A | * 12/1998 | Yamamoto et al. ............ 701/41 |
| 5,852,787 A | * 12/1998 | Fodor et al. .................... 701/6 |
| 6,021,367 A | * 2/2000 | Pilutti et al. ................... 701/41 |
| 6,053,270 A | * 4/2000 | Nishikawa et al. .......... 180/168 |
| 6,076,033 A | 6/2000 | Hamada et al. | |
| 6,226,587 B1 | 5/2001 | Tachihata et al. | |

FOREIGN PATENT DOCUMENTS

| | | |
|---|---|---|
| EP | 0 911 234 A2 | 4/1999 |
| JP | 11-096497 A | 4/1999 |
| JP | 2001-310719 A | 11/2001 |
| JP | 2002-032125 A | 1/2002 |

OTHER PUBLICATIONS

T. Pilutti et al., "Vehicle Steering Invention Through Differential Braking," American Control Conference 1995, pp. 1667–1671.

* cited by examiner

*Primary Examiner*—Gertrude A. Jeanglaude
(74) *Attorney, Agent, or Firm*—Foley & Lardner

(57) ABSTRACT

A lane-keep control system for a host-vehicle is arranged to detect a traveling condition of the host-vehicle, to detect a tendency of a lane deviation of the host-vehicle on the basis of the traveling condition, to calculate a driving/braking force controlled variable of each wheel according to the traveling condition so as to generate a yawing moment directed toward a direction of preventing the lane deviation when the tendency of the lane deviation is detected, to control a driving/braking force according to the driving/braking force controlled variable, to detect a steering state quantity indicative of a quantity of state of a steering wheel, and to correct the driving/braking force controlled variable on the basis of the steering state quantity.

11 Claims, 6 Drawing Sheets

HOST-VEHICLE SPEED

LANE-KEEP CONTROL SYSTEM FOR VEHICLE

BACKGROUND OF THE INVENTION

The present invention relates to a lane-keep control system which controls the vehicle so as to travel within a target lane.

Japanese Patent Provisional Publication No. 2001-310719 discloses a lane-keep control system which is arranged to prevent a host-vehicle from deviating from a traveling lane by controlling a driving/braking force when there is a deviation tendency of the host-vehicle from the traveling lane.

SUMMARY OF THE INVENTION

However, this system is required to ensure a further smooth operation fitted with a driver's feeling even if a direction of a yawing moment due to steering operation is the same as that of a yawing moment due to the driving/braking force control.

It is therefore an object of the present invention to provide an improved lane-keep control system which prevents a host-vehicle from deviating from a traveling lane by controlling a driving/braking force so as not to apply a strange feeling to a driver even if a direction of a yawing moment due to steering operation is the same as that of a yawing moment due to a driving/braking force control for a lane-keep control.

An aspect of the present invention resides in a lane-keep control system which is for a host-vehicle and comprises a control unit. The control unit is configured to detect a traveling condition of the host-vehicle, to determine that there is a tendency of a lane deviation that the host-vehicle is deviating from a traveling lane, on the basis of the traveling condition, to calculate a driving/braking force controlled variable of each wheel according to the traveling condition so as to generate a yawing moment directed toward a direction of preventing the lane deviation when there is the tendency of the lane deviation, to detect a steering state quantity indicative of a quantity of state of a steering wheel, to correct the driving/braking force controlled variable on the basis of the steering state quantity, and to control a driving/braking force of each wheel according to the driving/braking force controlled variable.

Another aspect of the present invention resides in a lane-keep control system of a host-vehicle which system comprises a traveling condition detecting device that detects a traveling condition including a state of a steering wheel of the host-vehicle; a brake hydraulic pressure control circuit that independently controls a hydraulic pressure of each wheel cylinder of the host-vehicle to generate a desired braking force of the host-vehicle; a driving torque control unit that controls a driving torque applied to driving wheels of the host-vehicle; and a driving/braking force control unit coupled to the traveling condition detecting device, the brake hydraulic control circuit and the driving torque control unit. The driving/braking force control unit is arranged to determine that there is a tendency of a lane deviation that the host-vehicle is deviating from a traveling lane, on the basis of the traveling condition, to calculate a target yawing moment reference value on the basis of the traveling condition when there is the tendency of the lane deviation, to calculate a target yawing moment by correcting the target yawing moment reference value according to a rate of change of the state of the steering wheel with respect to time, to calculate a target brake hydraulic pressure according to the traveling condition and the target yawing moment, to calculate a target driving force according to the traveling condition and the target brake hydraulic pressure, and to output a first drive signal indicative of the target brake hydraulic pressure to the brake hydraulic pressure control circuit and a second drive signal indicative of the target driving force to the driving force control unit.

A further another aspect of the present invention resides in a method of executing a lane-keep control of a host-vehicle. The method comprises a step for detecting a traveling condition of the host-vehicle; a step for determining that there is a tendency of a lane deviation that the host-vehicle is deviating from a traveling lane, on the basis of the traveling condition; a step for calculating a driving/braking force controlled variable of each wheel according to the traveling condition so as to generate a yawing moment directed toward a direction of preventing the lane deviation when there is the tendency of the lane deviation; a step of detecting a steering state quantity indicative of a quantity of state of a steering wheel; a step of correcting the driving/braking force controlled variable on the basis of the steering state quantity; and a step of controlling a driving/braking force of each wheel according to the driving/braking force controlled variable.

The other objects and features of this invention will become understood from the following description with reference to the accompanying drawings.

DETAILED DESCRIPTION OF THE INVENTION

Referring to FIGS. 1 through 5, there is shown a first embodiment of a lane-keep control system for a host-vehicle according to the present invention.

Figure 1:
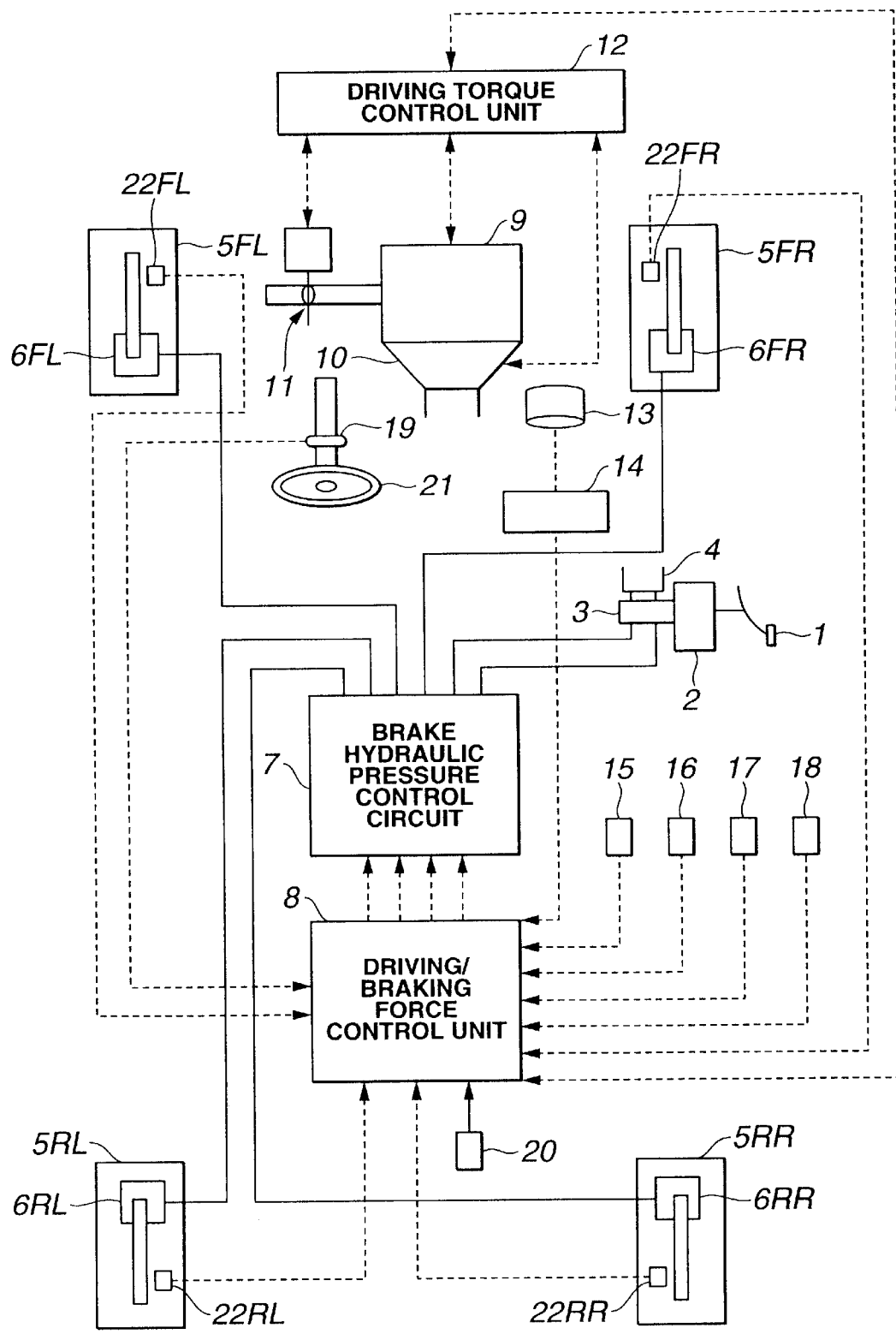
FIG. 1 is a schematic view showing a vehicle equipped with a lane-keep control system according to an embodiment of the present invention.

As shown in FIG. 1, the host-vehicle equipped with the lane-keep control system comprises a brake system which includes a brake pedal 1, a booster 2 and a master cylinder 3. Normally, each of wheel cylinders 6FL, 6FR, 6RL and 6RR receives brake hydraulic pressure pressurized by master cylinder according to a depression degree of brake pedal 1 depressed by a driver. Further, a brake hydraulic pressure control circuit 7 is provided between master cylinder 3 and each of wheel cylinders 6FL, 6FR, 6RL, and 6RR so as to be capable of independently controlling the hydraulic pressure of each of wheel cylinders 6FL, 6FR, 6RL and 6RR.

Brake hydraulic pressure control circuit 7 is common with a brake hydraulic pressure control circuit employed in an antiskid control system and/or a traction control system. In this embodiment, the brake system is arranged so as to independently increase and decrease brake hydraulic pressure of each of wheel cylinders 6FL, 6FR, 6RL and 6RR. Brake hydraulic pressure control circuit 7 controls the brake hydraulic pressure of each of wheel cylinders 6FL, 6FR, 6RL and 6RR according to a command brake hydraulic pressure outputted from driving/braking force control unit 8.

The host-vehicle comprises a driving torque control unit 12 which controls a driving torque applied to rear wheels 5RL and 5RR by controlling an operating condition of engine 9, a selected transmission ratio of an automatic transmission 10 and a throttle opening of a throttle valve 11. The control of the operating condition of engine 9 is executed by controlling a fuel injection quantity and ignition timing. Further, the control of the fuel injection quantity and the ignition timing may be simultaneously executed with the throttle opening control to control the operating condition of engine 9.

Driving torque control unit 12 is capable of independently controlling the driving torque of rear wheels 5RL and 5RR acting as driving wheels. Further, when driving torque control unit 12 receives a command driving torque from driving/braking force control unit 8, driving torque control unit 12 controls the driving torque with reference to the command driving torque.

The host-vehicle is further equipped with a CCD camera 13 and a camera controller 14 which function as an external recognition sensing unit for detecting a position of the host-vehicle relative to a traveling lane in order to determine whether the host-vehicle is deviating from a traveling lane, in other words, whether there is a tendency of a lane deviation of the host-vehicle from a traveling lane. Camera controller 14 detects lane markers of the traveling lane from an image picture indicative of an area ahead of the host-vehicle taken by CCD camera 13. On the basis of the obtained lane makers ahead of the host-vehicle, camera controller 14 defines a traveling lane and calculates a yaw angle $\Phi$ of the host-vehicle relative to the traveling lane, a lateral displacement X of the host-vehicle relative to a center of the traveling lane, a curvature $\beta$ of the traveling lane, a width L of the traveling lane and the like.

Furthermore, the host-vehicle is equipped with an acceleration sensor 15 for detecting a longitudinal acceleration Xg and a lateral acceleration Yg of the host-vehicle, a yaw rate sensor 16 for detecting a yaw rate $\Phi'$ of the host-vehicle, a master cylinder pressure sensor 17 for detecting a master cylinder pressure Pm indicative of an output pressure of master cylinder 3, an accelerator opening sensor 18 for detecting an accelerator opening Acc indicative of a depression degree of an accelerator pedal, a steering-wheel angle sensor 19 for detecting a steering-wheel angle $\lambda$ of a steering wheel 21, wheel speed sensors 22FL, 22FR, 22RL and 22RR for respectively detecting wheels speeds $Vw_{FL}$, $Vw_{FL}$, $Vw_{FL}$ and $Vw_{FL}$ of wheels 5FL, 5FR, 5RL and 5RR, and a directional-signal switch 20 for detecting a turn-direction indicating operation of the driver through turn-signal lamps. Driving/braking force control unit 8 receives detection signals of the above-discussed sensors 15 through 20 provided in the host-vehicle. Further, driving/braking force control unit 8 receives signals indicative of yaw angle $\Phi$, lateral displacement X, curvature $\beta$ and width L from camera controller 14, and driving torque Tw controlled by driving torque control unit 14.

When the traveling condition indicative data treated by driving/braking force control unit 8 includes a directionality of leftward or rightward, the data indicative of leftward is represented by a positive value. Accordingly, when the host-vehicle turns left, yaw rate $\Phi'$, lateral acceleration Yg, steering-wheel angle $\delta$ and yaw angle $\Phi$ respectively take positive values. Further, when the host-vehicle deviates from a center of the traveling lane to a leftward position, lateral displacement X takes a positive value.

Subsequently, there will be discussed a logic of the calculation process executed by driving/braking force control unit 8, with reference to a flowchart of FIG. 2. This calculation process is a timer interruption routine executed at 10 mill-seconds sampling-time intervals. Although this flowchart does not show a step for communication with various sensors and other control units shown in FIG. 1, information obtained by this calculation process is properly stored in a storage section of driving/braking force control unit 8, and the information needed in this calculation is properly read out.

At step S10, control unit 8 reads data outputted from various sensors, various controllers and control units shown in FIG. 1. Specifically, the data includes longitudinal acceleration Xg, lateral acceleration Yg, yaw rate $\Phi'$, each wheel speed $Vw_i$, accelerator opening Acc, master-cylinder pressure $P_m$, steering-wheel angle $\delta$, the turn-signal lamp switch signal, driving torque Tw outputted from driving torque control unit 12, yaw angle $\Phi$, lateral displacement X, curvature $\beta$, and width L.

At step S20, control unit 8 calculates vehicle speed V of the host-vehicle from an average of wheel speeds $Vw_{FL}$ and $Vw_{FR}$ of front-left and front-right wheels 5FL and 5FR which are of non-driving wheels.

At step S30, control unit 8 calculates an estimated future lateral displacement XS corresponding to a deviation estimate. More specifically, by using yaw angle $\Phi$, lateral displacement X, curvature $\beta$ and vehicle speed V, control unit 8 calculates the estimated future lateral displacement XS from the following expression (1):

$$XS = Tt \times V \times (\Phi + Tt \times V \times \beta) + X, \quad (1)$$

where Tt is a vehicle head time for calculating a front remarking distance, and the front remarking distance is calculated by multiplying vehicle head time Tt and vehicle speed V of the host-vehicle. That is, when estimated future lateral displacement XS at a moment, which vehicle heat time Tt elapsed, is greater than or equal to a lateral-displacement limit value $X_c$, control unit 8 determines that there is a possibility that the host-vehicle deviates the traveling lane or a tendency that the host-vehicle is deviating from the center of the traveling lane.

At step S40, control unit 8 determines a turning condition of the host-vehicle. More specifically, when an absolute value of the lateral acceleration Yg is greater than or equal to a predetermined positive value $Xg_0$, control unit 8 determines that the host-vehicle is put in the turning condition, and sets a vehicle unsteadiness flag $F_{US}$ ($F_{US}$=1). This determination may be executed by comparing yaw rate $\Phi'$ and a target yaw rate obtained from vehicle speed V and steering-wheel angle $\delta$. That is, control unit 8 determines whether the host-vehicle is put in an over-steer condition or an under-steer condition. On the basis of this determination, the vehicle unsteadiness flag $F_{US}$ may be set ($F_{US}$=1).

At step S50, control unit 8 determines whether or not the driver is executing a lane-change operation. More specifically, when the vehicle traveling direction determined from at least one of steering-wheel angle $\delta$ and the signal from turn-signal switch corresponds to the vehicle traveling direction determined from a plus/minus sign (+ or −) of the estimated future lateral displacement XS, control unit 8 determines that the lane change is executed according to the driver's intent, and sets a lane change flag $F_{LC}$ ($F_{LC}$=1) which indicates there is the driver's intent. When the vehicle traveling direction determined from at least one of steering-wheel angle δ and the signal from turn-signal switch is different from the vehicle traveling direction determined from a plus/minus sign (+ or −) of the estimated future lateral displacement XS, control unit 8 resets lane change flag $F_{LC}$ ($F_{LC}$=0).

At step S60, control unit 8 determines whether an alarming operation for informing a deviation tendency of the host-vehicle is executed or not. More specifically, control unit 8 determines whether or not the absolute value |XS| of the estimated future lateral displacement XS is greater than or equal to lateral-displacement limit value $X_C$ which is obtained by subtracting a half of a host-vehicle width $L_0$ from a half of the traveling-lane width L. When this determination is affirmative, control unit 8 executes the alarming operation. When the determination is negative, control unit 8 does not execute the alarming operation. A margin may be set between the absolute value |XS| of the estimate future lateral displacement and the lateral-displacement limit value $X_C$, or the limit value may include a hysteresis so as to prevent hunting of the alarming operation.

At step S70, control unit 8 determines whether or not there is a deviation tendency of the host-vehicle from the traveling lane. More specifically, as is similar to the execution at step S60, when absolute value |XS| of the estimated future lateral displacement is greater than or equal to lateral-displacement limit value $X_C$, control unit 8 determines that there is the deviation tendency of the host-vehicle from the traveling lane and therefore sets a lane deviation flag $F_{LD}$ ($F_{LD}$=1). When the determination at step S70 is negative, control unit 8 determines that there is no deviation tendency of the host-vehicle, and therefore resets the lane deviation flag $F_{LD}$ ($F_{LD}$=0). However, when the vehicle unsteadiness flag $F_{US}$ set at step S4 keeps the set condition ($F_{US}$=1), or when the lane-change flag $F_{LC}$ is put in the set condition ($F_{LC}$=1), the lane keep control is not executed. Therefore, in such a case, even if the absolute value |XS| is greater than or equal to the lateral-displacement limit value $X_C$, lane deviation flag $F_{LD}$ is set ($F_{LD}$=1).

At step S80, control unit 8 calculates a target yawing-moment reference value $M_{S0}$. Only when lane deviation flag $F_{LD}$ is put in the set condition ($F_{LD}$=1), target yawing-moment reference value $M_{S0}$ is determined. When lane deviation flag $F_{LD}$ is put in the set condition ($F_{LD}$=1), using a proportional coefficient $K_1$ determined from the specification of the vehicle, a proportional coefficient $K_2$ which is set according to vehicle speed V shown in FIG. 3, estimated future lateral displacement XS calculated at step S30 and the lateral-displacement limit value $X_C$, control unit 8 calculates target yawing-moment reference value $M_{S0}$ from the following expression (2):

$$M_{S0} = -K_1 \times K_2 \times (XS - X_C) \quad (2)$$

Further, it is assumed that when lane deviation flag $F_{LD}$ is put in the reset condition ($F_{LD}$=0), target yawing-moment reference value $M_{S0}$ takes zero ($M_{S0}$=0).

At step S100 subsequent to the execution of step S80, control unit 8 calculates and corrects target yawing moment $M_S$. More specifically, control unit 8 determines a correction coefficient Kdd according to a value obtained by differentiating steering-wheel angle δ, that is, according to steering-wheel speed dδ, with reference to a control map shown in FIGS. 4A and 4B. Further, control unit 8 calculates target yawing moment $M_S$ by multiplying correction coefficient Kdd and target yawing-moment reference value $M_{S0}$ ($M_S$= Kdd×$M_{S0}$), where the control map of FIG. 4A is employed when the host-vehicle is deviating leftward, and the control map of FIG. 4B is employed when the host-vehicle is deviating rightward.

Figure 4A:
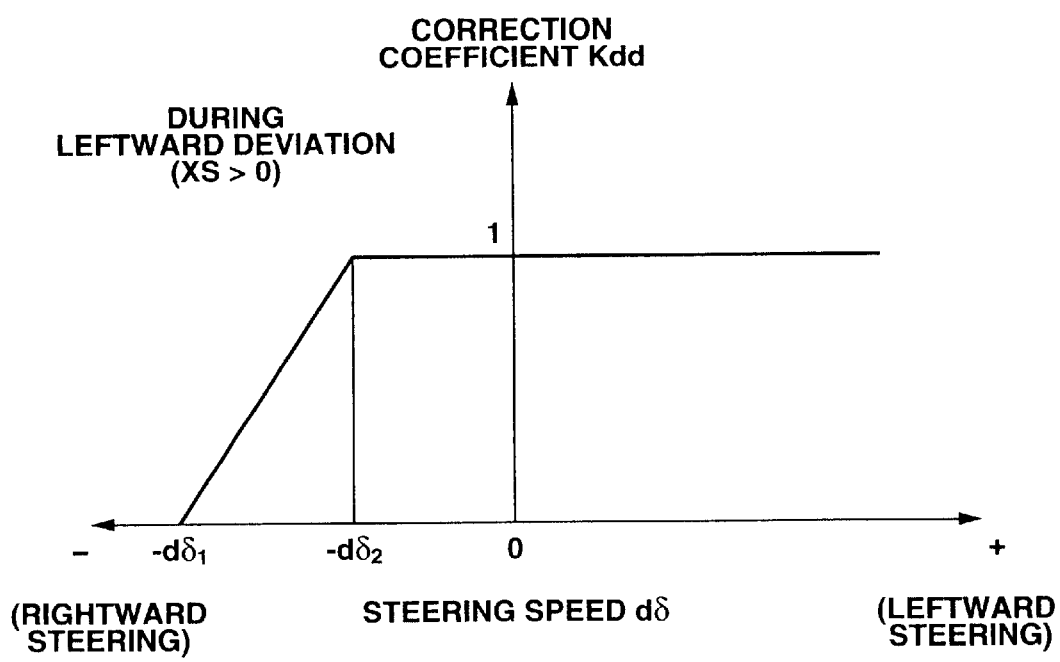
FIGS. 4A and 4B are control maps employed in the calculation process of FIG. 2.

More specifically, in FIG. 4A employed in the leftward deviation tendency, when steering-wheel speed dδ is greater than or equal to a second predetermined value $-d\delta_2$, correction coefficient Kdd is kept at 1 (Kdd=1). That is, when steering wheel 21 is temporally fixed or turned leftward (anticlockwise direction) under a leftward deviating condition, correction coefficient Kdd is kept at 1 (Kdd=1). Further, when steering-wheel speed dδ is smaller than or equal to a first predetermined value $-d\delta_1$, correction coefficient Kdd is kept at 0 (Kdd=0). That is, when steering wheel 21 is rapidly turned rightward (clockwise direction) under the leftward deviating condition, Kdd=0. Furthermore, when steering-wheel speed dδ is within a range from first predetermined value $-d\delta_1$ to second predetermined value $-d\delta_2$, correction coefficient Kdd is linearly decreased from 1 to 0 according to the decrease of steering-wheel speed dδ.

Figure 4B:
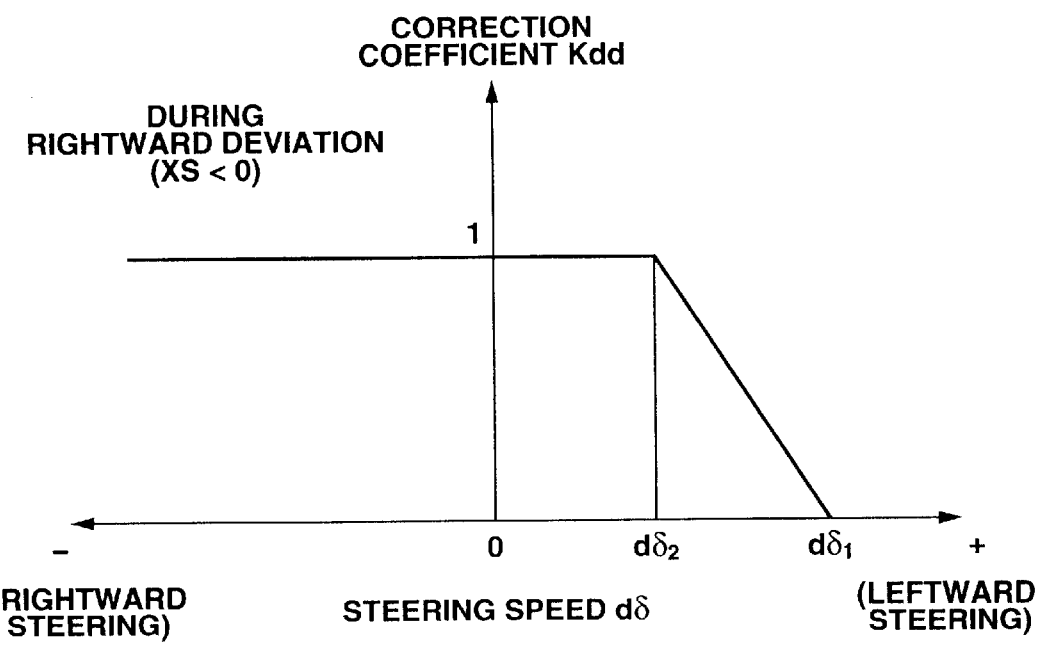

On the other hand, in FIG. 4B employed in the rightward deviation tendency, when steering-wheel speed dδ is smaller than or equal to a fourth predetermined value $d\delta_2$, correction coefficient Kdd is kept at 1 (Kdd=1). That is, when steering wheel 21 is temporally fixed or turned rightward (clockwise direction) under a rightward deviating condition, Kdd=1. Further, when steering-wheel speed dδ is greater than or equal to a third predetermined value $d\delta_1$, correction coefficient Kdd is kept at 0 (Kdd=0). That is, when steering wheel 21 is rapidly turned leftward (anticlockwise direction) under the rightward deviating condition, Kdd=0. Furthermore, when steering-wheel speed dδ is within a range from third predetermined value $d\delta_1$ to fourth predetermined value $d\delta_2$, correction coefficient Kdd is linearly decreased from 1 to 0 according to the increase of steering-wheel speed dδ.

That is, when the driver steers steering wheel 21 to suppress the lane deviation of the host-vehicle from the traveling lane, correction coefficient Kdd is decreased, and therefore target yawing moment $M_S$ is also decreased. More specifically, when the yawing moment generated by target yawing moment reference value $M_{S0}$ and the yawing moment due to the steering operation are directed in the same direction, the yawing moment due to the driving/braking force control is decreased by the yawing moment of the steering operation so as to preferably execute the lane-keep operation. On the other hand, when the driver does not execute the steering operation of suppressing the deviation of the host-vehicle from the traveling lane, correction coefficient Kdd is set at 1 so that target yawing moment $M_S$ is maintained at target yawing-moment reference value $M_{S0}$. This enables the lane-keep control system to firmly continue the lane-keep control.

At step S110, control unit 8 calculates target brake hydraulic pressures $P_{SFL}$, $P_{SFR}$, $P_{SRL}$ and $P_{SRR}$. More specifically, when lane deviation flag $F_{LD}$ is put in the reset condition ($F_{LD}$=0), both of target brake hydraulic pressures $P_{SFL}$ and $P_{SFR}$ to wheel cylinders 6FL and 6FR of front left and right wheels 5FL and 5FR are set at master cylinder pressure $P_m$, and both of target brake hydraulic pressures $P_{SRL}$ and $P_{SRR}$ to wheel cylinders 6RL and 6RR of rear left and right wheels 5RL and 5RR are set at rear wheel master cylinder pressure $P_{mR}$, where $P_{mR}$ is a rear wheel master cylinder pressure based on the front and rear braking force distribution of master cylinder pressure $P_m$ read at step S100.

Even when lane deviation flag $F_{LD}$ is set ($F_{LD}$=1), target brake hydraulic pressures $P_{SFL}$, $P_{SFR}$, $P_{SRL}$ and $P_{SRR}$ are determined according target yawing moment $M_S$ calculated at step S100. That is, when absolute value $|M_S|$ of the target yawing moment is smaller than target yawing-moment reference value $M_{S0}$, a difference is produced between the braking forces of the rear left and right wheels 5RL and 5RR. When the absolute value $|M_S|$ is greater than or equal to reference value $M_{S0}$, a difference is produced between the braking forces of the front and rear and left and right wheels. Therefore, when absolute value $|M_S|$ is smaller than reference value $M_{S0}$, a difference $\Delta P_{SF}$ between brake hydraulic pressures of front left and right wheels 5FL and 5FR takes zero, and a difference $\Delta P_{SR}$ between brake hydraulic pressures of rear left and right wheels 5RL and 5RR are expressed by the following expression (3). Similarly, when the absolute value $|M_S|$ is greater than or equal to reference value $M_{S0}$, the difference $\Delta P_{SF}$ between brake hydraulic pressures of front left and right wheels 5FL and 5FR is expressed by the following expression (4), and the difference $\Delta P_{SR}$ between brake hydraulic pressures of rear left and right wheels 5RL and 5RR are expressed by the following expression (5).

$$\Delta P_{SR} = 2 \times K_{bR} \times |M_S|/T \quad (3)$$

$$\Delta P_{SF} = 2 \times K_{bF} \times (|M_S| - M_{S0})/T \quad (4)$$

$$\Delta P_{SR} = 2 \times K_{bR} \times |M_{S0}|/T \quad (5)$$

where T is a tread common in front and rear wheels, $K_{bF}$ and $K_{bR}$ are conversion coefficients for converting braking force into brake hydraulic pressure and are determined according to the brake specifications.

Therefore, when target yawing moment $M_s$ takes a negative value, that is, when the host-vehicle is deviating leftward, target brake hydraulic pressures $P_{Si}$ (i=FL, FR, RL and RR) to be applied to the respective wheel cylinders 6FL, 6FR, 6RL and 6RR are expressed by the following expressions (6).

$$P_{SFL} = P_m$$

$$P_{SFR} = P_m + \Delta P_{SF}$$

$$P_{SRL} = P_m$$

$$P_{SRR} = P_m + \Delta P_{SR} \quad (6)$$

On the other hand, when target yawing moment $M_S$ takes a positive value, that is, when the host-vehicle deviating rightward, target brake hydraulic pressures $P_{Si}$ to be applied to the respective wheel cylinders 6FL, 6FR, 6RL and 6RR are expressed by the following expressions (7).

$$P_{SFL} = P_m + \Delta P_{SF}$$

$$P_{SFR} = P_m$$

$$P_{SRL} = P_m + \Delta P_{SR}$$

$$P_{SRR} = P_m \quad (7)$$

At step S120 subsequent to the execution of step S110, control unit 8 calculates a target driving force of driving wheels 5RL and 5RR. More specifically, when lane deviation flag $F_{LD}$ is set ($F_{LD}$=1) and when the lane-keep control is being executed, control unit 8 controls engine 9 so as to restrict the acceleration of the host-vehicle by limiting the output of engine 9 even when the accelerating operation is executed. Therefore, when lane deviation flag $F_{LD}$ is set ($F_{LD}$=1), target driving torque $Trq_{DS}$ is set at a value obtained by subtracting a value corresponding to a sum of target brake hydraulic pressure differences $\Delta P_{SF}$ and $\Delta P_{SR}$ from a value corresponding to accelerator opening Acc read at step S10. More specifically, the value corresponding to accelerator opening Acc is a driving torque for accelerating the host-vehicle according to accelerator opening Acc, and the value corresponding to the sum of target brake hydraulic pressure differences $\Delta P_{SF}$ and $\Delta P_{SR}$ is a braking torque generated by the sum of target brake hydraulic pressure differences $\Delta P_{SF}$ and $\Delta P_{SR}$. Accordingly, when lane deviation flag $F_{LD}$ is set ($F_{LD}$=1) and when the lane-keep control is being executed, the torque of engine 9 is decreased by a braking torque generated by the sum of target brake hydraulic pressure differences $\Delta P_{SF}$ and $\Delta P_{SR}$. Further, when lane deviation torque $F_{LD}$ is reset ($F_{LD}$=0), target driving torque $Trq_{DS}$ is set at the driving torque for accelerating the host-vehicle according to accelerator opening Acc.

At step S130, control unit 8 outputs a first drive signal indicative of the target brake hydraulic pressure calculated at step S110 to brake hydraulic pressure control circuit 7, and outputs a second drive signal indicative of target driving torque $Trq_{DS}$ calculated at step S120, to driving torque control unit 12. Thereafter, the routine proceeds to a return step to return the main program.

With this calculation process, when the turn of the host-vehicle is not a sharp turn and when the driver does not intend to change the traveling lane and when the estimated future lateral displacement XS is greater than or equal to lateral-displacement limit value $X_C$, control unit 8 determines that there is a deviation tendency of the host-vehicle from the traveling lane, and therefore sets lane deviation flag $F_{LD}$ ($F_{LD}$=1). Control unit 8 calculates target yawing moment $M_S$ (target yawing moment reference value $M_{S0}$) on the basis of the difference between the estimated future lateral displacement XS and lateral-displacement limit value $X_C$. Further, control unit 8 controls the braking force of each wheel so as to achieve target yawing moment $M_S$. With this control, when the steering input is small, control unit 8 produces a deviation preventing yawing moment to prevent the host-vehicle from deviating from the traveling lane, and produces a braking force to decelerate the host-vehicle. This further safely prevents the host-vehicle from deviating from the traveling lane.

Further, the first embodiment according to the present invention is arranged to decelerate the host-vehicle by decreasing the output torque of engine 8 during when the lane-keep control is being executed. This arrangement enables the host-vehicle to further safely continue the lane-keep traveling.

Figure 5A:
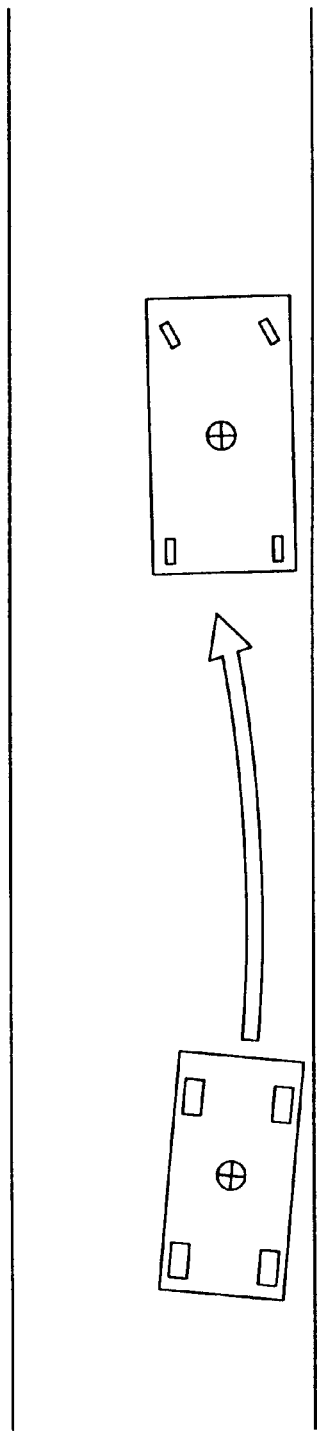
FIGS. 5A and 5B are explanatory views for an operation of the calculation process of FIG. 2.
Figure 5B:
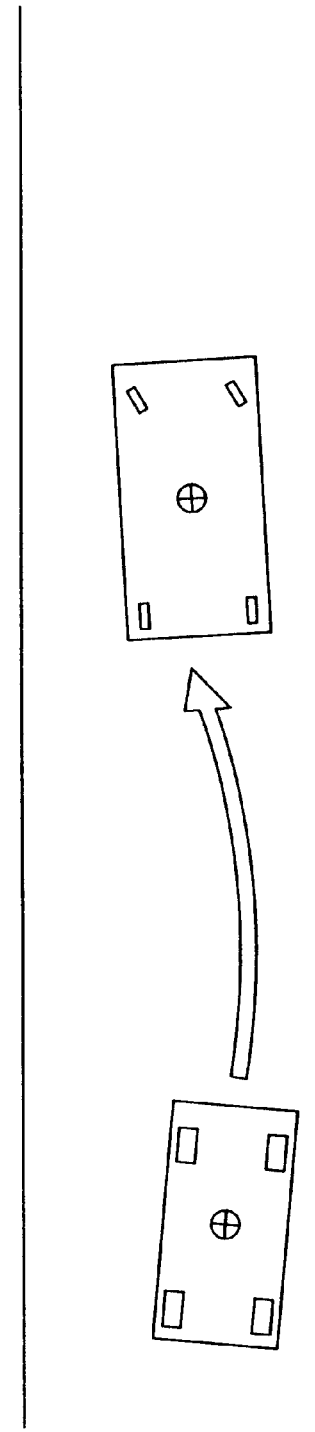

Furthermore, when the steering input is produced so as to suppress the deviation as discussed above, that is, when the yawing moment due to the driving/braking force control and the yawing moment due to the steering input are directed in the same direction, correction coefficient Kdd, which is multiplied with a difference between estimated future lateral displacement XS and lateral-displacement limit value $X_C$ to obtain the target yawing-moment reference value $M_{S0}$, is set at a smaller value according to the increase of the steering-wheel speed dδ toward the direction for suppressing the deviation. Further, the target moment $M_S$ is calculated by multiplying correction coefficient Kdd with target yawing-moment reference value $M_{S0}$. Accordingly, it becomes possible to naturally execute the lane-keep control as shown in FIG. 5A. If the correction of the yawing moment based on estimated future lateral displacement XS and lateral-displacement limit value $X_C$ is not executed even though the yawing moment due to the driving/braking force control and the yawing moment due to the steering input are directed in the same direction, the host-vehicle turns excessively rather than the driver intended, as shown in FIG. 5B. This creates a strange feeling to the driver.

Figure 2:
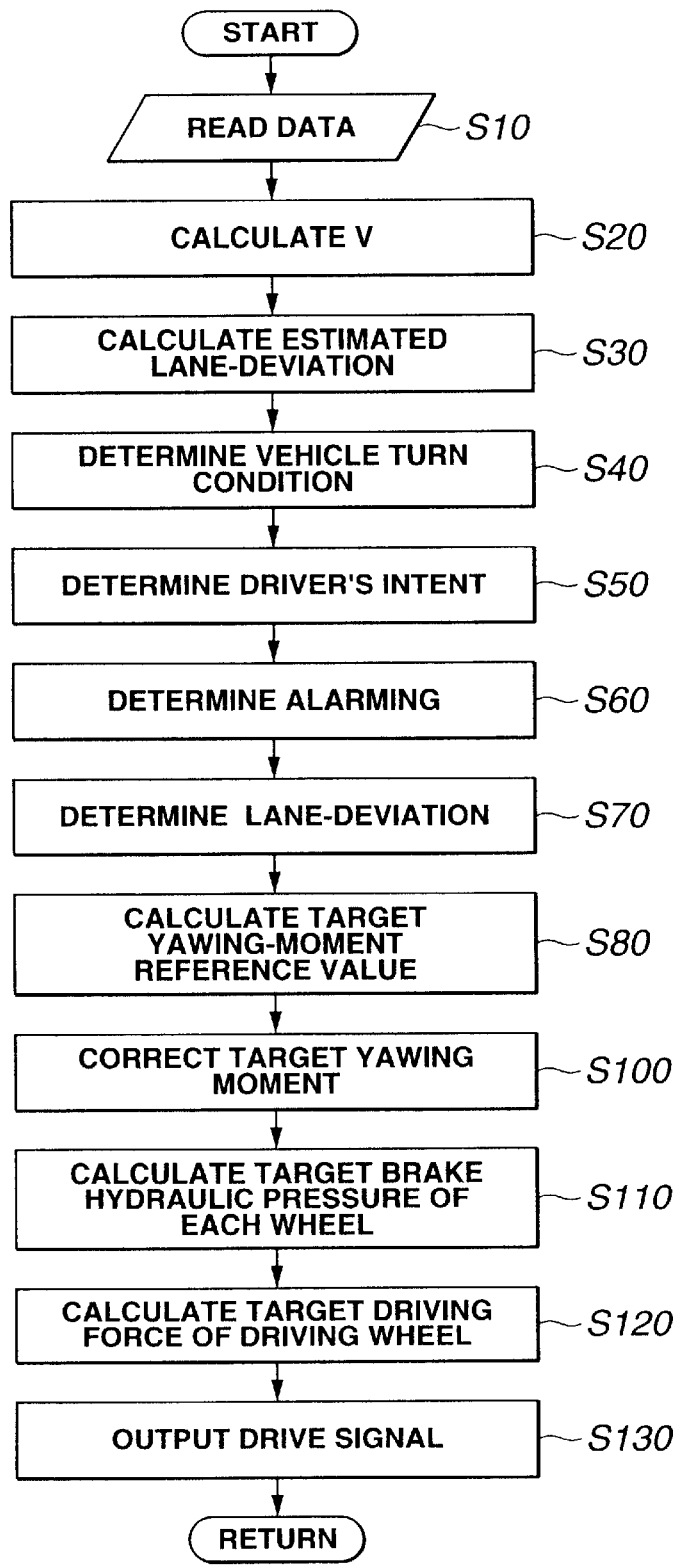
FIG. 2 is a flowchart showing an information calculation process executed by a driving/braking force control unit of FIG. 1.
Figure 3:
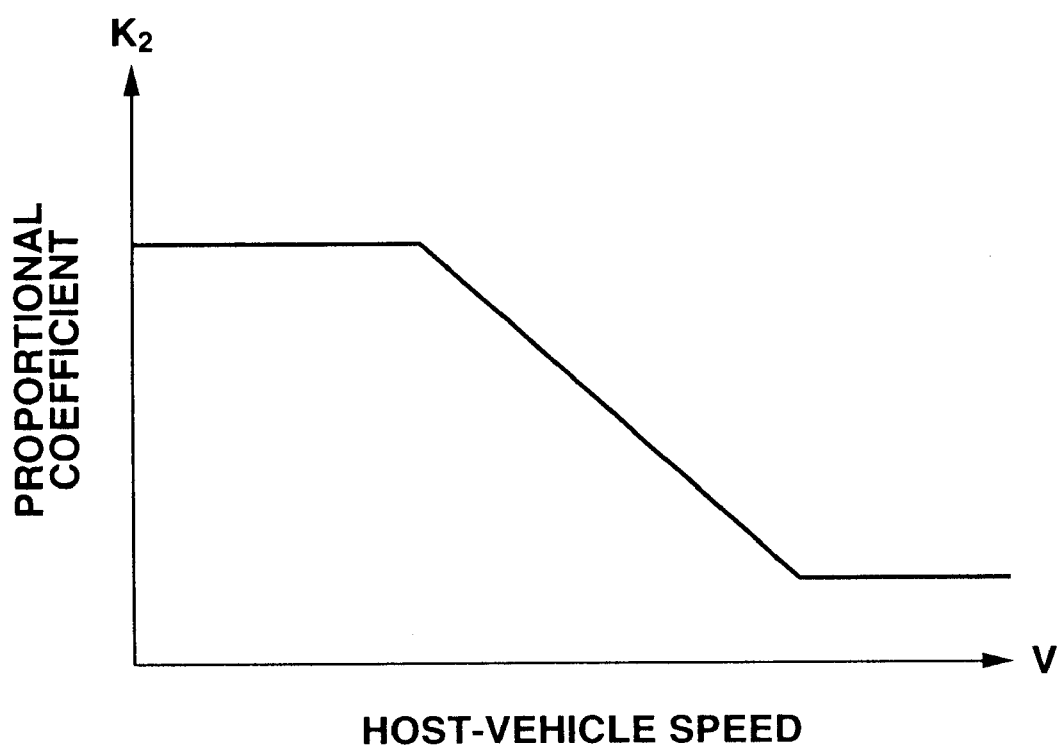
FIG. 3 is a control map employed in the calculation process of FIG. 2.

In this first embodiment, the respective sensors 15 through 20 and 22FL, 22FR, 22RL and 22RR, camera controller 14 and step S10 of the calculation process shown in FIG. 2 construct traveling condition detecting means. Step S70 of the calculation process shown in FIG. 2 constructs deviation determining means. Steps S110 and S120 of the calculation process shown in FIG. 2 construct driving/braking force controlled variable calculating means. Brake hydraulic pressure control circuit 7 of FIG. 1 and driving torque control unit 12 construct driving/braking force control means. Step S100 of the calculation process of FIG. 2 constructs driving/braking force controlled variable correcting means.

Subsequently, there will be discussed a second embodiment of the lane-keep control system according to the present invention with reference to FIG. 6.

The basic construction of the host-vehicle equipped with the lane-keep control system of the second embodiment is basically the same as that of the first embodiment shown in FIG. 1. In this second embodiment, driving/braking force control unit 8 executes the calculation process according to a flowchart of FIG. 6. The calculation process shown in FIG. 6 newly includes step S91 just after step S80, and step S101 is newly employed instead of step S100. The other steps are the same as those of the flowchart in FIG. 2. Herein, the new steps S91 and S101 will be discussed.

Figure 6:
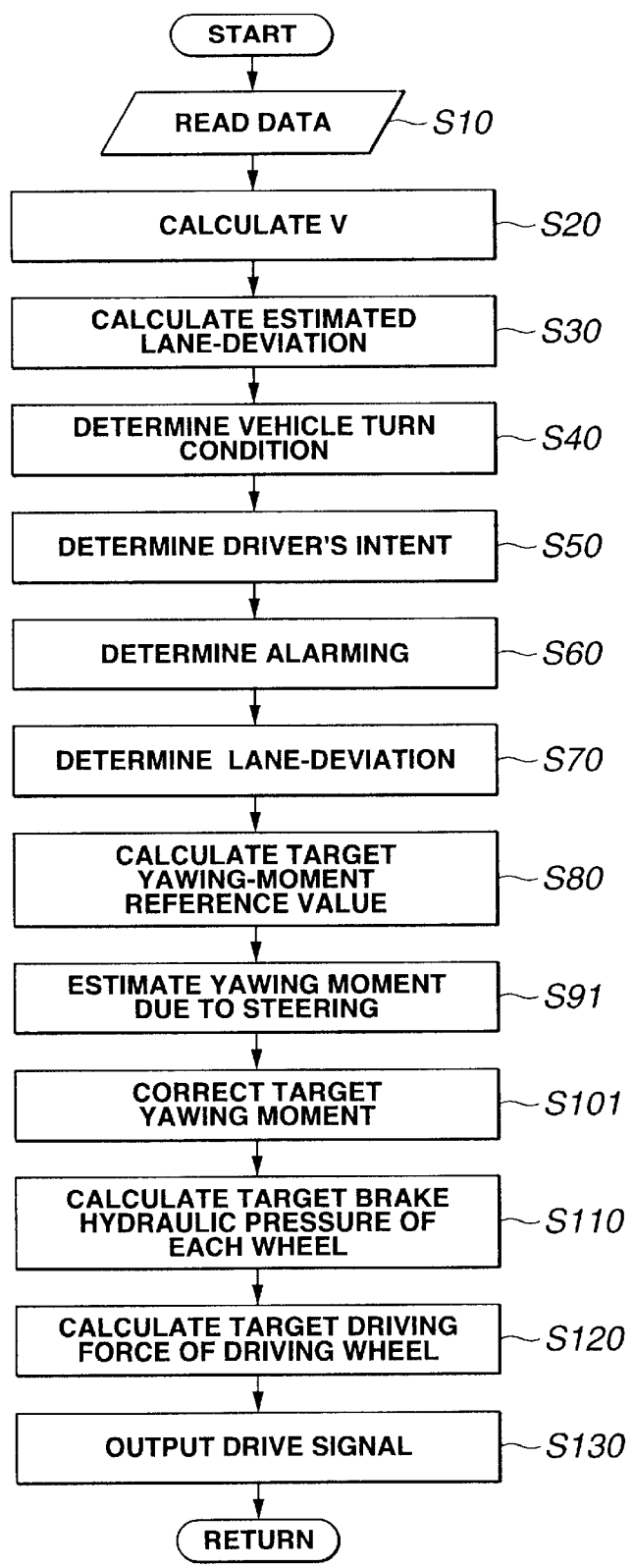
FIG. 6 is a flowchart showing an information calculation process executed by a driving/braking force control unit of a second embodiment according to the present invention.

As shown in FIG. 6, at step S91 subsequent to the execution of step S80, control unit 8 estimates the yawing moment generated by the steering operation. More specifically, control unit 8 calculates the steering-wheel angle variation $\Delta\delta$ from a difference between a previous steering-wheel angle $\delta_{(n-1)}$ and a steering-wheel angle $\delta_{(n-2)}$ previous to the previous angle $\delta_{(n-1)}$. Then, control unit 8 calculates yawing moment $M_{STR}$ due to the steering operation by multiplying a proportional coefficient $K_{S1}$ determined from the vehicle specifications with the obtained steering-wheel angle variation $\Delta\delta$. The yawing moment $M_{STR}$ due to the steering operation may be obtained from the yawing moment including a non-linear range of a tire generating force using a vehicle model.

Further, at step S101, control unit 8 corrects target yawing moment $M_S$. More specifically, when a plus/minus sign (+ or −) of the estimated future lateral displacement XS is different from that of steering-wheel angle variation $\Delta\delta$ calculated at step S91, that is, when there is a steering input for suppressing the deviation from the traveling lane, and further when both of the target yawing moment reference value $M_{SO}$ calculated at step S80 and the yawing moment due to the steering operation (calculated at step S91) take negative value, in other words, when the estimated future lateral displacement XS takes a positive value and when the steering-wheel angle variation $\Delta\delta$ takes a negative value, the target yawing moment $M_S$ is set at a smaller one of a value obtained by subtracting yawing moment $M_{STR}$ due to the steering operation from target yawing moment reference value $M_{SO}$ and zero.

Adversely, when a plus/minus sign (+ or −) of the estimated future lateral displacement XS is different from that of steering-wheel angle variation $\Delta\delta$ calculated at step S91, that is, when there is a steering input for suppressing the deviation from the traveling lane, and further when both of target yawing moment reference value $M_{SO}$ calculated at step S80 and the yawing moment due to the steering operation, which is calculated at step S91, take positive values, that is, when the estimated lateral displacement XS takes a negative value and when the steering-wheel angle variation $\Delta\delta$ takes a positive value, target yawing moment $M_S$ is set at a larger one of the value obtained by subtracting yawing moment $M_{STR}$ due to the steering operation from the target yawing moment reference value $M_{SO}$ and zero.

Further, when a plus/minus sign (+ or −) of the estimated future lateral displacement XS is as same as that of steering-wheel angle variation $\Delta\delta$ calculated at step S91, that is, when there is no steering input for suppressing the deviation from the traveling lane, target yawing moment $M_S$ is set at target yawing-moment reference value $M_{SO}$. Accordingly, when the driver executes a steering operation to suppress the deviation from the traveling lane, the magnitude of target yawing-moment reference value $M_{SO}$ is decreased in absolute value by yawing moment $M_{STR}$ due to the steering operation to properly execute the lane-keep control.

On the other hand, when the driver does not execute the steering operation to suppress the lane deviation from the traveling lane, target yawing moment $M_S$ is maintained at the initial target yawing-moment reference value $M_{SO}$ to firmly avoid the deviation of the host-vehicle from the traveling lane.

With this calculation process of the second embodiment, as is similar to the advantages of the first embodiment, when the turn of the host-vehicle is not a sharp turn and when the driver does not intend to change the traveling lane and when the estimated future lateral displacement XS is greater than or equal to lateral displacement limit value $X_C$, control unit 8 determines that there is a deviation tendency of the host-vehicle from the traveling lane, and therefore control unit 8 sets lane deviation flag $F_{LD}$ ($F_{LD}=1$). Control unit 8 calculates target yawing moment $M_S$ on the basis of the difference between the estimated future lateral displacement XS and lateral-displacement limit value $X_C$. Further, control unit 8 controls the braking force of each wheel so as to achieve target yawing moment $M_S$. With this control, when the steering input is small, control unit 8 produces the deviation preventing yawing moment to prevent the host-vehicle from deviating from the traveling lane, and produces a braking force to decelerate the host-vehicle. This further safely prevents the host-vehicle from being deviated from the traveling lane.

Further, the second embodiment according to the present invention is arranged to decelerate the host-vehicle by decreasing the output torque of engine 8 during when the lane-keep control is being executed. This arrangement enables the host-vehicle to further safely continue the lane-keep traveling.

Furthermore, when the steering input is produced so as to suppress the deviation as discussed above, that is, when the yawing moment due to the driving/braking force control and the yawing moment due to the steering input are directed in the same direction, control unit 8 calculates yawing moment $M_{STR}$ due to steering operation according to steering-wheel angle deviation $\Delta\delta$, relative to target yawing-moment reference value $M_{SO}$ based on estimated future lateral displacement XS and lateral-displacement limit value $X_C$, and sets target yawing moment $M_S$ at the value obtained for subtracting yawing moment $M_{STR}$ from the target yawing-moment reference value $M_{SO}$. Accordingly, the lane-keep control system of the second embodiment smoothly and naturally performs lane-keep control.

In this second embodiment, the respective sensors 15 through 20 and 22FL, 22FR, 22RL and 22RR, camera controller 14 and step S10 of the calculation process shown in FIG. 6 construct traveling condition detecting means. Step S70 of the calculation process shown in FIG. 6 constructs deviation determining means. Steps S110 and S120 of the calculation process shown in FIG. 6 construct driving/braking force controlled variable calculating means. Brake hydraulic pressure control circuit 7 of FIG. 1 and driving torque control unit 12 construct driving/braking force control means. Steps S91 and S100 of the calculation process of FIG. 2 construct driving/braking force controlled variable correcting means.

Although the first and second embodiments according to the present invention have been shown and described such that the lateral-displacement limit value $X_C$, which functions as a threshold for determining the deviation of the host-vehicle from the traveling lane, is calculated from the width of the host-vehicle and the width of the traveling lane, it may be fixed at 0.8 m if this system is employed in a high-way in Japan where the width of the traveling lane has been determined as 3.5 m be law.

This application is based on Japanese Patent Applications No. 2001-304139 filed on Sep. 28, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A lane-keep control system for a host-vehicle, comprising:
    a control unit configured,
    to detect a traveling condition of the host-vehicle,
    to determine that there is a tendency of a lane deviation that the host-vehicle is deviating from a traveling lane, on the basis of the traveling condition,
    to calculate a driving/braking force controlled variable of each wheel according to the traveling condition so as to generate a yawing moment directed toward a direction of preventing the lane deviation when there is the tendency of the lane deviation,
    to detect a steering state quantity indicative of a quantity of state of a steering wheel,
    to correct the driving/braking force controlled variable on the basis of the steering state quantity, and
    to control a driving/braking force of each wheel according to the driving/braking force controlled variable.

2. The lane-keep control system as claimed in claim 1, wherein the control unit is configured to correct the driving/braking force controlled variable according to the steering state quantity so as to decrease the yawing moment directed toward the direction of preventing the host-vehicle from deviating from the traveling lane when the steering state quantity acts to suppress the lane deviation.

3. The lane-keep control system as claimed in claim 1, wherein the control unit is configured to estimate a yawing moment due to a steering operation from the steering state quantity, and to correct the driving/braking force controlled variable according to the estimated yawing moment.

4. The lane-keep control system as claimed in claim 1, wherein the control unit is configured to calculate a target yawing moment from a difference between a future lateral displacement of the host-vehicle relative to the traveling lane and a lateral displacement limit value, where the future lateral displacement is estimated from the steering state quantity, and to calculate the driving/braking force controlled variable on the basis of the target yawing moment.

5. The lane-keep control system as claimed in claim 4, wherein the control unit is configured to estimate a yawing moment due to a steering operation from the steering state quantity, to obtain a corrected target yawing moment by subtracting the yawing moment due to the steering operation from the target yawing moment, and to correct the driving/braking force controlled variable on the basis of the corrected target yawing moment.

6. The lane-keep control system as claimed in claim 1, wherein the control unit is capable of independently controlling braking forces of right and left wheels of the host-vehicle.

7. The lane-keep control system as claimed in claim 1, wherein the control unit is configured to determine that there is the tendency of the lane deviation when a future lateral displacement of the host-vehicle relative to a traveling lane becomes greater than or equal to a lateral displacement limit value, where the future lateral displacement is estimated from the traveling condition.

8. The lane-keep control system as claimed in claim 1, wherein the driving/braking force control variable includes a target yawing moment MS which is determined from the following expression:

$$MS = Kdd \times M_{S0},$$

where $M_{S0} = -K_1 \times K_2 \times (XS - X_C)$, $K_1$ is a constant determined by vehicle specifications, $K_2$ is a coefficient which is decreased according to an increase of a vehicle speed, $X_C$ a value obtained by subtracting a half of a host-vehicle width $L_0$ from a half of a traveling-lane width L, and XS is a future lateral displacement expressed by the following expression, $$XS = Tt \times V \times (\Phi + Tt \times V \times \beta) + X,$$

where Tt is a vehicle head time for calculating a front remarking distance, and the front remarking distance is calculated by multiplying the vehicle head time Tt and vehicle speed V of the host-vehicle, $\Phi$ is a yaw angle of the host-vehicle relative to the traveling lane, X is a lateral displacement X of the host-vehicle relative to a center of the traveling lane, and $\beta$ is a curvature of the traveling lane.

9. A lane-keep control system of a host-vehicle comprising:
    a traveling condition detecting device that detects a traveling condition of the host-vehicle, the traveling condition including a state of a steering wheel;
    a brake hydraulic pressure control circuit that independently controls a hydraulic pressure of each wheel cylinder of the host-vehicle to generate a desired braking force of the host-vehicle;
    a driving torque control unit that controls a driving torque applied to driving wheels of the host-vehicle; and
    a driving/braking force control unit coupled to the traveling condition detecting device, the brake hydraulic control circuit and the driving torque control unit, the driving/braking force control unit being arranged,
    to determine that there is a tendency of a lane deviation that the host-vehicle is deviating from a traveling lane, on the basis of the traveling condition,
    to calculate a target yawing moment reference value on the basis of the traveling condition when there is the tendency of the lane deviation, to calculate a target yawing moment by correcting the target yawing moment reference value according to a rate of change of the state of the steering wheel with respect to time, to calculate a target brake hydraulic pressure according to the traveling condition and the target yawing moment, to calculate a target driving force according to the traveling condition and the target brake hydraulic pressure, and to output a first drive signal indicative of the target brake hydraulic pressure to the brake hydraulic pressure control circuit and a second drive signal indicative of the target driving force to the driving force control unit.

10. A method of executing a lane-keep control of a host-vehicle, comprising:

detecting a traveling condition of the host-vehicle;

determining that there is a tendency of a lane deviation that the host-vehicle is deviating from a traveling lane, on the basis of the traveling condition;

calculating a driving/braking force controlled variable of each wheel according to the traveling condition so as to generate a yawing moment directed toward a direction of preventing the lane deviation when there is the tendency of the lane deviation;

detecting a steering state quantity indicative of a quantity of state of a steering wheel;

correcting the driving/braking force controlled variable on the basis of the steering state quantity; and controlling a driving/braking force of each wheel according to the driving/braking force controlled variable.

11. A lane-keep control system for a host-vehicle, comprising:

traveling condition detecting means for detecting a traveling condition of the host-vehicle;

deviation determining means for determining that there is a tendency of a lane deviation that the host-vehicle is deviating from a traveling lane, on the basis of the traveling condition;

driving/braking force control quantity calculating means for calculating a driving/braking force controlled variable of each wheel according to the traveling condition so as to generate a yawing moment directed toward a direction of preventing the lane deviation when there is the tendency of the lane deviation;

driving/braking force controlling means for controlling a driving/braking force of each wheel according to the driving/braking force controlled variable; and steering condition quantity detecting means for detecting a steering state quantity indicative of a quantity of state of a steering wheel;

wherein the driving/braking control quantity calculating means comprises driving/braking force controlled-variable correcting means for correcting the driving/braking force controlled variable on the basis of the steering state quantity.

* * * * *